United States Patent

Fuls et al.

[11] Patent Number: 6,063,323
[45] Date of Patent: May 16, 2000

[54] PROCESS AND INSTALLATION FOR MAKING EXTRUDED SINTERED CERAMIC ARTIFACT

[75] Inventors: Paul F Fuls, Pretoria; André K Joubert, Sabie; Diederik Kapp, Brits, all of South Africa

[73] Assignee: Implico B.V., Amsterdam, Netherlands

[21] Appl. No.: 08/983,080

[22] PCT Filed: May 20, 1997

[86] PCT No.: PCT/NL97/00284

§ 371 Date: Jun. 1, 1998

§ 102(e) Date: Jun. 1, 1998

[87] PCT Pub. No.: WO97/44170

PCT Pub. Date: Nov. 27, 1997

[30] Foreign Application Priority Data

May 17, 1996 [ZA] South Africa ............................ 96/3960

[51] Int. Cl.[7] .............................. B28B 5/00; B28B 17/00; C04B 35/64

[52] U.S. Cl. .......................... 264/432; 264/433; 264/434; 264/437; 264/474; 264/639; 264/678; 425/113; 425/174

[58] Field of Search ............................... 264/176.1, 209.1, 264/209.3, 639, 118, 177.12, 204, 345, 414, 432, 433, 434, 437, 474, 678; 425/461, 94, 174, 113; 428/116, 188, 36.9, 34.4, 34.5

[56] References Cited

U.S. PATENT DOCUMENTS

| 2,770,861 | 11/1956 | Schmunk ..................................... 25/39 |
| 3,795,183 | 3/1974 | Roth et al. ................................ 99/353 |
| 3,847,535 | 11/1974 | Cahoon, Jr. et al. .................... 425/291 |
| 3,899,326 | 8/1975 | Frost et al. .............................. 264/639 |
| 3,983,283 | 9/1976 | Bagley ..................................... 425/461 |
| 4,163,640 | 8/1979 | Higuchi et al. .......................... 428/116 |
| 4,666,775 | 5/1987 | Kim et al. ................................ 428/398 |
| 4,810,458 | 3/1989 | Oshima et al. ............................ 425/94 |
| 5,670,104 | 9/1997 | Miura et al. ........................ 264/177.12 |

FOREIGN PATENT DOCUMENTS

| 0242503 | 10/1987 | European Pat. Off. . |
| 0284309 B1 | 9/1988 | European Pat. Off. . |
| 0284309 B2 | 9/1988 | European Pat. Off. . |
| 0650944 | 5/1995 | European Pat. Off. . |
| 0700882 | 3/1996 | European Pat. Off. . |
| 7-294122 | 11/1995 | Japan . |
| 1216807 | 12/1970 | United Kingdom . |

*Primary Examiner*—Rena L. Dye
*Attorney, Agent, or Firm*—Fulbright & Jaworski LLP

[57] ABSTRACT

A process and installation are provided for making an extruded sintered ceramic product. The method involves extruding a moist profile and simultaneously drying it with microwave radiation as it is extruded. As the profile is extruded and dried, it is supported at a position where it has been at least partially dried. The installation comprises extrusion means for extruding a moist profile, support means for supporting the extruded profile at an at least partially dried part thereof, and a microwave radiation source for directing microwaves at the profile.

18 Claims, 1 Drawing Sheet

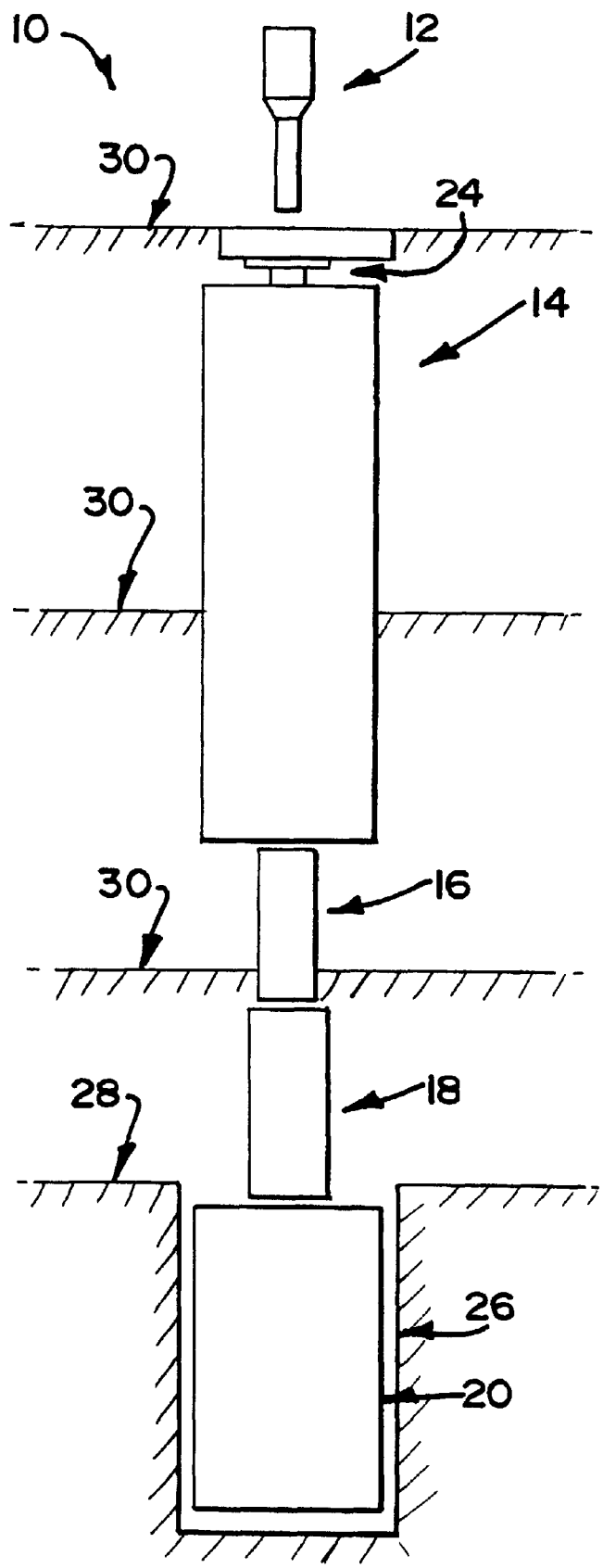

PROCESS AND INSTALLATION FOR MAKING EXTRUDED SINTERED CERAMIC ARTIFACT

BACKGROUND OF THE INVENTION

1. Field of the Invention

THIS INVENTION relates to a process of and an installation for use in making an extruded sintered ceramic artifact.

2. Brief Summary of the Invention

According to the invention there is provided a process for making an extruded sintered ceramic product, which process includes the steps of:

extruding an elongated moist profile, which profile comprises a moist ceramic composition or a moist precursor thereof;

drying the extruded profile by subjecting it to microwave radiation having a frequency of $0.3 \times 10^9 - 1 \times 10^{10}$ Hz to cause the profile to become progressively drier in the direction in which it is extruded; and supporting the extruded profile during the extrusion and drying to provide a dried profile, the extruded profile being supported at a position where it has been at least partially dried by the microwave radiation.

Supporting the profile will comprise applying a supporting force to the profile to prevent it from sagging or deforming unacceptably under gravity, the supporting force being applied to the profile at a position or positions where the profile has been dried sufficiently by the microwave radiation to receive such force without said unacceptable sagging or deforming. The supporting force is preferably applied to the profile at a position or positions removed or spaced from the microwave radiation.

The extruding may be in a downward direction, preferably in a vertically downward direction. The supporting in this case will thus be at a position below that where the extrusion takes place, and also below the position at which the profile is dried by the microwave radiation, to obtain a substantially straight dried extrusion.

Instead, the extrusion may be in an upward direction and the supporting may be at a position above the extrusion position. The supporting may be accompanied by displacing of the profile such as to cause a desired deformation of the profile, as it dries, eg so that the dried profile is curved along its length and/or has a differently shaped cross-section from that of the moist profile.

In each case the process of the invention may include the optional step of sintering the dried profile; and the process may be carried out continuously or batchwise.

As the extruding takes place, supporting the profile may be by frictionally engaging it by means of support means. In other words, when the extrusion is vertically downwardly, supporting the profile may be by frictionally engaging it, eg by means of support means in the form of one or more pairs of profiled rollers, whose rotation is synchronized with the extrusion, or by gripping it with releasable support means such as two or more pneumatic travelling chucks, conveniently arranged in pairs, which are moved synchronously with the rate of extrusion of the profile, said rotation or movement taking into account dimensional changes in the profile caused by the microwave radiation. Gripping the profile may be at a plurality of positions spaced along its length by a plurality of said releasable support means, each of which successively engages the profile at a high level, then descends synchronously with the profile, then releases the profile at a low level and then re-engages the profile at said high level. Preferably, gripping of the profile takes place at a position or positions where the profile has been dried. The profile may have a leading end which is extruded into contact with a support, the leading end resting on the support and the support descending synchronously with the profile.

The extrusion is preferably continuous. More particularly, the extrusion may be continuous, the drying taking place continuously while the profile is extruded, and the profile being supported continuously while it is extruded.

In a particular embodiment of the process of the present invention, the profile may be subjected to a progressively reducing microwave power input along its length during extrusion thereof, the rate of power reduction also preferably reducing progressively. While the rate of microwave power input, and the rate of reduction thereof, may reduce continuously, they preferably reduce stepwise. For example, the profile may, immediately after being extruded, be subjected to a relatively high microwave power input for a relatively short period, by passing it through a short zone of high microwave intensity, the profile then being subjected to an intermediate microwave power input for an intermediate period, by passing it through an intermediate zone of intermediate length and of intermediate microwave intensity, and the profile being finally subjected to a low microwave power input for a long period, by passing it through a relatively long zone of relatively low microwave intensity. In this context short and long with regard to length and period are relative, respectively, to the intermediate length and intermediate period, and high and low with regard to power input and intensity are relative, respectively, to the intermediate power input and intermediate intensity.

The process may include the step of intermittently and successively separating lowermost portions of the dried profile from the remainder thereof, after they have been subjected to the microwave radiation. The separation may be carried out by means of a vertically reciprocable cutting device, such as a flying saw, eg a diamond saw, laser beam or water jet, arranged to descend intermittently and synchronously with the profile, below the position where the profile is supported, the separation being carried out while the cutting device is descending. In other words, the separation may be carried out by means of a vertically reciprocating cutting device arranged to descend intermittently and synchronously with the profile, the separation being by cutting each said portion of the profile in a plane transverse to its length while the cutting device descends synchronously with the profile.

Thus, two or more vertically reciprocable support means such as travelling chucks may be provided for supporting the profile, a further vertically reciprocable support means may be provided for carrying a cutting device and one or more vertically reciprocable support means may be provided for gripping and moving cut portions down and out of the way of the descending profile, eg to a subsequent cooling stage or to a subsequent sintering stage and optionally thereafter. Preferably the profile, after extrusion, is supported so that it is subjected to tensile and compressive stresses which are no greater than those capable of being withstood by said profile, bearing in mind its strength and other physical characteristics, at the various stages of the microwave heating.

The profile may be subjected merely to low-temperature drying, by being heated to a maximum temperature of between 100–700° C., preferably 100–500° C., eg 120–200° C., by the microwave radiation, before the portions are separated therefrom. It will be appreciated that suitable temperatures for drying, calcining and sintering of the profile will be dependent upon the composition of said profile. In one embodiment the profile is subjected to drying followed by microwave radiation whereby it is at least calcined by said microwave radiation, being heated thereby to a temperature of 700–1200° C., eg 1050° C., before the separation, the separation optionally taking place after some cooling of the profile.

While subjecting the profile to the microwave radiation may be such as to sinter the profile, eg by means of microwave radiation, before the portions are separated therefrom, in an alternative embodiment of the process the portions are separated after the profile has been dried, and optionally calcined, by the microwave radiation, but before the sintering takes place, the separated portions then being sintered, eg by subjecting them to further microwave radiation or infrared heating elsewhere. The sintering may be carried out by lowering each portion, while supporting it so that it extends vertically, and subjecting it to the further microwave radiation as it is lowered. Routine experimentation will be necessary to determine the optimum sintering temperatures depending on the composition of the portions. In one embodiment of the invention sintering may involve heating the portions (or the profile before it is severed if severing takes place after sintering) to a temperature of >1200° C., preferably >1350° C. and more preferably >1550° C., eg 1600–2400° C. and typically 1600–1800° C.

As mentioned above, the process may include the steps of calcining the dried profile and sintering said profile, the calcining and sintering being by subjecting the profile to further microwave radiation, to produce a ceramic product. Preferably, the calcining is carried out at a temperature of 700–1200° C., the sintering being carried out at a temperature of 1600–2400° C. The calcining and sintering may be carried out while the profile is being lowered and while it is being supported so that it extends vertically. The calcining and sintering, as described previously, may be carried out on portions of the profile which have been separated from the remainder thereof.

The rate of extrusion and the rate of heating of the profile should be matched in order to achieve a product of desired quality. Similarly, ambient atmospheric conditions surrounding the profile and/or portion should also be controlled with regard to circulation, humidity, temperature, composition, or the like.

More particularly, the profile may be extruded downwardly through a die into a microwave cavity. The extrusion may be by means of a ram or screw extruder. The cavity may be vertically elongated. In this case the cavity may be provided with a plurality of microwave sources, at least some of which are adjustable as regards their microwave output, and which may be both vertically and circumferentially spaced from each other around a central zone in the cavity down which the profile passes.

Said sources may be adjustable as to the frequency/wavelength of the microwave radiation produced thereby, as to the intensity/amplitude or power of the microwave radiation produced thereby, as to the direction of propagation of the microwave radiation and/or concentration or compression thereof into more or less discrete beams, etc. Thus, for example, the microwave cavity may be of the travelling wave type, the dynamically tuned standing wave type, the meander- or serpentine type, the multimode type to enable different overlapping standing waves to be generated, or a suitable hybrid type of two or more of the aforegoing.

For profiles of large cross-section, microwave cavities of the multimode type have been found to be suitable. The sintering may take place in a microwave cavity similar to that used for the drying.

As drying, calcining and sintering take place, the moisture content and structure/composition of the material of the profile or portion will change progressively, leading to progressive changes in the microwave absorbency or loss factor of said material, together with progressive dimensional and/or strength changes of the profile or portion. These factors should be borne in mind when subjecting the profile to the microwave radiation, by adjusting or tuning the microwave radiation so that, at each level or position along the length of the descending profile or portion, it is subjected to optimum or at least adequate microwave radiation, particularly as far as intensity/power is concerned, so that it is heated at an acceptable rate of temperature increase and undergoes such temperature holds or soaks at constant temperature for such periods as are acceptable or desirable. Routine experimentation should be employed to optimize the microwave radiation so that the profile or portion is at different temperatures at different positions along its length, for acceptable drying, calcining and sintering. Suitable drying regimes or methods are described in U.S. Pat. No. 5,979,073, assigned to Implico B. V. Typically, the microwave radiation to which the profile or portion is subjected will vary (increase or decrease) as regards at least some characteristics thereof along the length of the profile or portion, although it may naturally remain constant over selected portions of said length. Preferably, the profile is subjected to substantially uniform microwave radiation over its external surface area. It should be noted that to achieve optimum radiation of the profile, there should be no foreign or extraneous material, such as impurities present in the material forming the profile, present in the cavity which could interfere with the radiation being applied to the profile. Naturally, the support means supporting the profile should preferably be located at a position spaced or removed from the microwave cavity.

The ceramic product made in accordance with the invention may be a ceramic filtration support suitable for use in supporting a filtration membrane in a filter element used for micro- or ultrafiltration applications, particularly high pressure filtration. It will be appreciated that the process in accordance with the invention is not limited to filtration supports for filter elements, but extends to the making of other extruded ceramic products produced by extrusion, such as hollow extruded clay sections, clay bricks, clay tiles or the like.

It will be appreciated that, dependent upon the ceramic product required, the extrusion may be a paste selected and/or blended from one or more suitable ceramic materials or precursors thereof. Typically the following factors will be taken into account when selecting or blending a suitable ceramic material to be used in accordance with the process of the present invention:

Finished Product Attributes
Porosity
Strength
Impact resistance
Abrasive wear resistance
Chemical resistance
Temperature shock resistance
Operating temperature
Thermal and electrical conductivity
Expansion coefficient
Extrusion Attributes
Ability to be efficiently blended
Plasticity Cohesive strength
Lubricity
Repeatability of performance
    Drying/Sintering Attributes
Drying behaviour
Binder performance through the various temperature regimens
Stability through changes of state
Dielectric characteristics and conductive characteristics, eg dielectric constant and loss factor(s), throughout the heating cycle.

When the extrusion is to be handled or supported at one or more intermediate stages of its treatment, additional criteria or attributes, eg strength in the intermediate state, will need to be considered when selecting or blending a suitable ceramic composition for extrusion.

In a particular embodiment of the invention a suitable green ceramic composition for a high grade filter support may comprise suitable proportions of aluminum oxide (ceramic), methyl cellulose (binder/plasticizer), polyalkylene glycol (lubricant), aluminium oxide monohydrate (plasticizer/sintering aid) and aluminium oxychloride resin (binder).

More particularly, when the process of the invention is used for making a filtration support, the extrusion may be of a particulate mixture comprising a suitable ceramic such as α-alumina or a precursor thereof, and of a maximum particle size of 100 μm, preferably 60 μm, and an average particle size of 10–40 μm, preferably 15–25 μm. The extrusion preferably takes place of a green paste material having a moisture content of 5–20% by mass, preferably 8–15% by mass. The green material may comprise an organic binder/plasticizer which makes up 1–20%, typically 2–4%, by mass of the mixture on a dry basis, an inorganic binder which makes up 2–10%, typically 4–6% by mass of the composition on a wet basis, a lubricant which makes up 0.5–3%, eg 0.7–1,2% on a wet basis and a plasticizer/sintering aid which makes up 2–10%, preferably 4–6% by mass on a wet basis. By a precursor is meant a material, which, when subjected successively to drying, calcining and sintering, is converted into the ultimate ceramic in question.

The particle size will be selected to provide a product of the desired porosity and pore size, while the moisture content, and type and proportion of binder, will be selected for suitable extrusion (lubrication of the die, green strength, etc) and for suitable microwave heating (loss factors, internal stresses in the profile or portion, homogeneous heating, etc).

Using a clay such as mullite as a binder allows low sintering temperatures of 1300–1400° C., eg 1350° C., whereas using organic and/or inorganic binders, plasticizers, lubricants and sintering aids allows a high purity ceramic (eg α-alumina) product to be produced, but usually requires higher sintering temperatures of >1550° C., eg the 1600–1800° C. mentioned above.

For ceramic filtration supports the process may comprise extruding the profile which is usually circular (although it may be eg hexagonal or octagonal) in cross-section, and so that it has a plurality of parallel passages in its interior extending along its length, of a desired size and spacing. Thus, it may be extruded with a plurality of filtration passages which are arranged in eg concentric circles seen in end elevation, and with one or more drainage passages, the filtration passages typically being of the same or a smaller diameter than the drainage passage(s), of which there is conveniently one, centrally located in the profile. In this way a support can be provided which can typically be used by feeding a fluid to be filtered into one end thereof, into the filter passages under pressure, retentate passing out of the opposite end of the support and filtrate or permeate permeating transversely through the material of the support, to exude from its outer surface and/or into such drainage passage or passages as are provided, to drain from the ends thereof.

In this case the process will typically include the step of applying a filter membrane to the walls or surfaces of the filter passages, optionally after drying and cooling and before sintering, so that the membrane can be sintered to said passage surfaces in the sintering step. Suitable membranes can be applied in known fashion, eg using sol-gel technology, various examples being set out in R. R. Bhave. Inorganic Membranes: Synthesis, Characteristics and Applications. pp 21–38, Van Nostrand Reinhold, New York. A revolving or rectilinear pocketed receiver may be used to store the separated portions of profile, either before or after the sintering, or both, as required by the sequence of steps chosen. Naturally, if desired, the filter membrane may be applied after sintering, the support being then re-sintered to sinter the membrane in place.

In a particular embodiment of the process a profile is extruded which is of relatively large cross-section, eg equivalent to that of a circular profile having a diameter of 50–200 mm or more, and in lengths of over 1500 mm, eg 3000–6000 mm or more, before it is severed. It will be appreciated that the length of the profile will in principle be governed only by height of the installation, and by such difficulties, if any, as are encountered in supporting the profiles.

Although extrusion in a vertically downward direction has been emphasised hereinabove, it will be appreciated that, for suitable profiles, the process can be carried out in a vertically upward direction or a horizontal direction, eg using a walking beam or pusher system or the like, which supports the profiles and carries them through a microwave cavity, optionally intermittently, with microwave irradiation being discontinued during movement. In this way, eg by cutting the supported profile at an early stage into short lengths, tiles can be made from a flat extrusion, or ceramic filtration supports can be made from an elongated extrusion, or discs for use as plates can be cut from a cylindrical extrusion, before being carried through a microwave cavity.

Suitable microwave radiation can have a wavelength of 1–10 GHz, preferably 2.45 GHz, the intensity or power naturally being selected, depending on the composition, cross-section and rate of movement of the profile or portion and on the desired heating rate and depth of penetration required thereof, as well as capital costs.

According to another aspect of the invention there is provided an installation for use in the making of a dried sintered ceramic product, which installation comprises:

an extrusion means for extruding a profile of a moist mixture comprising a ceramic composition or precursor thereof;

a support means for supporting the extruded profile; and at least one microwave radiation source operable to direct microwave radiation at at least part of the profile, for drying the profile, the support means being arranged to support the extruded profile at a position where the profile has at least partially been dried by microwave radiation from the microwave radiation source.

The installation may include severing means for severing the profile into a plurality of portions, after drying of the profile.

The extrusion means may be a ram- or a screw extruder provided with a suitable die; and it may be arranged to effect vertical extrusion of an elongated profile in a downward direction. Preferably, the extrusion means is an extruder, such as a screw extruder, provided with a die, the extruder being arranged to effect extrusion of an elongated profile in a vertically downward direction.

The support means may comprise one or more chucks, or friction support means, arranged to move, as described above, substantially synchronously with the elongated profile as it is extruded. Accordingly, the support means may comprise at least one chuck arranged to grip the profile, each chuck being arranged, while gripping the profile, to move downwardly synchronously with the profile as the profile is extruded. The support means may be arranged to support the elongated profile at various points along its length so that it is subjected to tensile and compressive stresses capable of being withstood by said profile, bearing in mind its strength and other physical characteristics at the various stages of the microwave heating.

There may be a plurality of microwave radiation sources, and at least some said sources may be adjustable, eg as to power output (amplitude/intensity) and/or wavelength/frequency.

The microwave radiation source or sources may be coupled into at least one of a travelling-wave, dynamically tuned standing-wave, meander- or serpentine, multimode applicator or any other suitable microwave applicator. In a preferred embodiment for the purposes of drying and/or sintering large-diameter ceramic extrusions, a multimode cavity may be employed to generate overlapping standing waves. The microwave heat sources may be arranged in a microwave cavity which is located below the extruder so that the cavity can receive the profile as it is extruded, the or each support means being located below the microwave cavity together with the severing means. Preferably, the size and shape of the cavity is arranged to enclose the profile in a snug or close-fashion.

Preferably, the installation has a microwave cavity, the cavity being provided with a plurality of said microwave sources, at least some of which are adjustable as regards their microwave output, the sources being vertically and circumferentially spaced from one another around a central zone in the cavity down which, in use, the profile passes. The radiation sources may form part of a multimode microwave cavity.

The severing means may be a flying cut-off saw such as a diamond saw, a water nozzle, a laser, or the like, whichever is suitable for the purpose and/or depending on the ceramic temperature, etc.

Optionally, the installation includes a storage/cooling device, eg a revolving pocketed receiver.

The installation may comprise two microwave cavities, namely an initial cavity, provided with the extruder as described above and with the severing device, for drying and/or calcining the profile, and a final cavity, provided with support means for lowering severed portions of the profile, vertically aligned, therethrough, for sintering the portions. A said storage and cooling device may be provided between the cavities and after the final cavity. Naturally, drying and sintering may, if desired, be carried out sequentially in a single cavity.

The microwave sources may be arranged in each cavity, in circumferentially and/or longitudinally spaced relationship, around a central path in the cavity down which the profile or portion, as the case may be, passes, the sources being arranged to direct microwave radiation at a said profile or portion in said path. Each microwave cavity may be provided by a vertically extending microwave oven having an outlet at its lower end and the extruder or an inlet at its upper end, as the case may be.

The invention also extends to a dried profile whenever prepared by a process as described above.

As mentioned above, the profile may have a plurality of parallel passages in its interior extending along its length, the profile being circular in cross-section and having a diameter of 50–200 mm, and the profile having a length of 300–6000 mm.

BRIEF DESCRIPTION OF THE VIEW OF THE DRAWING

The invention will now be described, by way of example, with reference to the accompanying diagrammatic drawing, in which the single FIGURE shows a schematic side elevation of a pilot installation proposed in accordance with the present invention for carrying out the process in accordance with the present invention.

DETAILED DESCRIPTION OF INVENTION

In the drawing, reference numeral 10 generally designates a pilot installation in accordance with the present invention and for carrying out the process of the present invention. The installation comprises, broadly, an extruder 12 arranged to extrude a profile vertically downwardly, and a microwave cavity 14, below the extruder 12, and arranged to receive and permit passage downwardly therethrough of a downwardly moving profile as it is extruded from the extruder.

Below the cavity 14 a hollow cooling column 16 is provided, arranged to receive said profile as it moves downwardly and issues from the lower end of the cavity 14, and to permit the profile to pass downwardly therethrough and issue from its lower end. Below the column 16 is a profile handling and severing stage 18, described in more detail hereunder, and, below the stage 18, is a profile storage and cooling unit 20.

The extruder 12 is a split-barrel de-aerating vertical screw extruder (a ram extruder can be used instead), equipped with a horizontal pneumatic feed ram. The extruder 12 is mechanically driven and has an inverter variable speed drive. The extruder 12 is pivotally mounted about a horizontal axis into a horizontal condition; and it is mounted on a tilting counter-weighted column, which column can be pneumatically tilted to swing the extruder 12 in a horizontal direction, clear of its position shown in the drawings. The extruder 12 has a circular die, described in more detail hereunder.

The microwave cavity 14 is of regular pentagonal horizontal cross-section, having five vertically extending wall panels, each of which is provided with a vertically extending row of vertically spaced openings, each opening being provided for receiving a microwave source in the form of a magnetron/waveguide/fan assembly. The cavity 14 has twenty such assemblies located in selected openings in the wall panels of the cavity 14. There are substantially more than twenty said openings, so that, by selecting suitable openings to receive the assemblies, the assemblies can be installed in said wall panels in a desired vertically and/or circumferentially spaced array, the array in turn being selected to allow the assemblies to heat an extruded profile descending through the cavity 14, so that it is heated at a desired rate and has a desired temperature profile along its length.

The cavity 14 is vertically elongated, and is housed in a matching pentagonal housing, radially spaced from the cavity 14, made of a frame having doors attached thereto, which can be opened for easy access to the wall panels of the cavity 14. These doors are earth-strapped and provide an effective Faraday cage. The top and bottom of the cavity 14 are open, the top being immediately below the die of the extruder 12, which die is at the lower end of the extruder 12. The top of the cavity is separated from the die by a rotating laser-based measuring device 24 for measuring, continuously, the diameter of a profile being extruded from the die. The device 24 is a reciprocating and revolving laser measuring device.

The space between the extruded profile and the inner surfaces of the wall panels of the cavity 14 contains thermal insulation. A refrigerated air source is provided, together with a fan, arranged to feed a forced draft of refrigerated air upwardly into the space between the cavity 14 and the housing, which forms an air plenum, and the fan of each magnetron assembly has an inlet communicating with this plenum. The lowermost portions of the wall panels of the cavity 14 are water-cooled by means of a water-jacket or water-tubes (cooling coils). The cavity 14 is about 5 m in height, and its top is provided with a fume extraction fan to remove air from the plenum. Provision is made for the controlled flow of gas of a controlled temperature and humidity in the space between the extrusion and the wall panels of the cavity 14.

The cooling column 16 is about 1,5 m in height and comprises water-cooled thermal insulating material, which material tapers so that it reduces in thickness in a downward direction.

The profile handling stage 18 comprises two vertically spaced and vertically reciprocable water-cooled pneumatically operable chucks, each chuck having eight jaws which are faced with refractory ceramic material. Said stage 18 also comprises a third chuck which is similar except that it has four jaws. Each said chuck is powered by a microprocessor-controlled stepper motor and each said motor drives a low-backlash precision power nut mounted on a vertically extending fixed screw. Each chuck is vertically slidable along a hardened chromed steel shaft, along which it is guided by linear ball bearings. The stage 18 further includes, below the lower eight-jawed chuck and above the four-jawed chuck, a saw mounted on a vertically reciprocable mounting having a flat blade which has a plane which is horizontal for sawing in a horizontal direction, and which is also microprocessor-controlled and mounted in similar fashion to said chucks.

The unit 20 is circular and is arranged to rotate about a vertical axis, being located in a cylindrical sump 26 of insulated sheet steel-lined concrete construction and sunk into the ground 28. It has a circumferentially extending row of upwardly opening elongated vertically extending pockets therein, for receiving portions of a profile extruded by the extruder 12. The unit 20 is arranged to be indexed to present empty pockets in succession, at a position below and vertically in line with the extruder 12; and the unit 20 is synchronised with the four-jawed chuck, as will emerge hereunder.

Two optical sensors are provided in the cavity 14, for measuring the temperature of the extruded profile in the cavity 14; and three spaced thermocouples are provided in the insulation of one or more of the cavity wall panels, for monitoring the temperature profile of the extruded profile in the cavity 14. Each magnetron assembly has an over-temperature cut-out switch, similar switches being installed in said air plenum and/or on the cavity wall panels. Amplified diode assemblies are provided in the plenum to monitor microwave radiation continuously. Similar diode assemblies are provided at selected points external to the installation to monitor microwave radiation.

The installation 10 extends upwardly from the ground 28, and is shown located in a building having floors or storeys 30.

In use the installation 10 is intended to produce elongated sintered α-alumina profiles of up to 2 m in length or longer, eg cylindrical profiles, which may be up to 100 mm in diameter. Thus, batches of maximum particle size 60 μm and average size of about 20 μm in dry or a semi-dry form are mixed at a temperature of 15–20° C. in a mechanical mixer with water and with α-alumina monohydrate powder (5.4% by mass on a wet basis), methyl cellulose (2.7% by mass), kaolin (2% by mass) and polyalkylene glycol (0.9% by mass), to provide a green paste mixture whose moisture content is about 12.5% by mass. These batches are allowed to age for 2–5 days to promote homogeneity before the moisture content is increased to 14.9%, the ageing period depending on the shear expected during extrusion, and they are then successively fed into the extruder 12 using its horizontal pneumatic feed ram and from each batch a profile is continuously extruded, with the extruder 12 vertical, through its die by its screw or ram. The composition can be varied as necessary depending on the method of extrusion (screw or ram).

The exact composition of the green paste mixture is set out in the Table below and the process of preparation of said paste is set out in more detail after the Table according to the Example.

TABLE

| % (Wet basis) | Compound | Code | Function |
|---|---|---|---|
| 70.4 | Alcoa Tab. Alumina T-60-325 STD (99% < 45 μm) | A | Basic powder |
| 3.7 | Alcoa Reactive Calcined Alumina: A17 NE (90% < 8 μm) | B | Basic powder |
| 5.4 | α-Alumina monohydrate powder (supplied under the name or code KCM GC Powder - obtainable from Keith Ceramics) | C | Plasticizer/sintering aid |
| 2.7 | Methyl cellulose (supplied under the name or code Celocol HPM 15000 DS - obtainable from Courtaulds Chemicals) | D | Plasticizer/binder |
| 2.0 | Sletwyn Kaolin (supplied by Rainbow Industrial Chemicals) | E | Flux material |
| 0.9 | Polyalkylene Glycol (supplied under the name or code Breox 75W - 18000 - obtainable from British Petroleum) | F | Lubricant |
| 14.9 | Water | | |
| Σ100.0 | | | |

The various constituents of the composition in the Table have been given alphabetic codes for ease of explanation of the paste/extrusion body preparation process in the following Example.

EXAMPLE

A paste/extrusion body was prepared by the cooling of the constituents A, B, C, D, E, and a solution of F in 43% of the total mass of water, to a temperature of 10° C. Constituents A, B, C, D and E were then mixed together in the following sequence of steps. Constituent A was mixed with constituent B for 5 minutes in a ribbon blade mixer. Constituent C was then added to the mixture and mixing was carried out for a further 5 minutes. Constituent D was then added to the mixture and mixing was carried out for a further 5 minutes. Constituent E was then added to the mixture and mixing was carried out for a further 15 minutes. 41% of the total mass of the water was then added to the mixture and mixing was continued for a further 30 minutes. The moist powder mixture obtained was then stored in a sealed container overnight at a temperature of about 10° C. Constituent F was then added to the moist powder and further mixing was carried out in a high shear mixer for 10 minutes. The resultant paste/extrusion body mixture was then stored and aged in a sealed container at a temperature of 10° C. for 3 days. After addition of the last 16% of the toal mass of the water, the aged paste was mixed in a high shear mixer for 90 seconds immediately prior to extrusion thereof.

The die is sized to extrude a profile of about 98 mm diameter, having a plurality of filtration passages amounting to thirty-six in number, each of 9 mm diameter, which extend the length of the profile, parallel to one another and to the profile. The die also provides the profile with a central drainage passage along its length, coaxial and parallel with the profile and of 9 mm diameter. The passages are arranged in three circular rows, and the rows are equally radially spaced from each other and from the axis and surface of the profile. They form three concentric circles when seen in end elevation, namely an outer circle of eighteen passages and an inner circle of six passages, and an intermediate circle of twelve passages. The profile is intended to form a support for a filter membrane.

As the support is extruded its diameter and rate of extrusion are continually monitored by the measuring device 24. As the support descends through the cavity 14 the magnetron assemblies in the wall panels of the cavity 14 are used to direct microwave radiation at the profile to heat it, with the optical sensors and thermocouples continuously monitoring its temperature profile along its length. The microwave radiation is set at a frequency of 2.45 GHz and each magnetron assembly has its power output adjusted by microprocessor control to heat the support appropriately along its length to provide said desired temperature profile therein.

This temperature profile is selected so that the support is initially dried where it first enters the cavity 14 and is subsequently calcined. The support thus heats up at a controlled rate, selected to reduce or avoid any damage or dimensional changes to the support, and so that the support issues downwardly from the cavity 14 at a temperature in the range from 100° C. to $\geq 2000°$ C. During the drying refrigerated air is forced upwardly through the plenum around the cavity 14.

Below the cavity 14 the descending profile enters the water-cooled column 16 where it is cooled to a temperature of no more than about 350–400° C., whereafter it issues from the lower end of the column 16.

Particularly good results are obtained when the magnetron assemblies are arranged so that, when the profile leaves the die, it is subjected for 1 minute to the full power output of the magnetron assemblies used (ie 2 kW), followed by 50% of such power output for 2 minutes (or until constant moisture content is achieved) followed by a final 8 minutes at 25% power output.

At the start of extrusion of a batch of green paste a column of polypropylene and/or PTFE rods of the same diameter as the profile and stacked end to end is gripped by the chucks and is used to support, on the top of the uppermost rod, the lower end of the extrusion. Once the extrusion is of a sufficient length and the rods have descended sufficiently to be unharmed by any heat conducted down from the drying extrusion heating is started. The rods travel downwardly synchronously with the profile so that the profile is not subjected to any unacceptable tensile or compressive stresses which can damage it or change its dimensions, particularly immediately after it leaves the die and has low green strength. When the rods emerge from the chucks, the rods are removed downwardly and the chucks grip the profile instead. The uppermost level at which the rods support the profile is selected accordingly, and is about 400–600 mm below the die.

When the eight-jawed chuck supporting the rods or the profile as the case may be, has descended sufficiently, the lower eight-jawed chuck also grips the profile to support them. The lower said chuck then travels downwardly, similarly synchronously with the descending rods or profile, while the upper said chuck releases the rods or profile and reciprocates upwardly, again to grip them at a high level. The lower chuck then releases them and travels upwardly, after which it again grips the descending rods or profile. The two eight-jawed chucks are thus synchronised with each other and travel up and down in hand-over-hand alternating fashion, gripping the rods or profile as they move down and releasing them when they move up. Once the rods are below the level of the lower chuck they are removed. At all times thereafter, at least one of these chucks grips the descending profile after it has been gripped for the first time, operation of the chucks being microprocessor-controlled and synchronised with the screw of the extruder 12 and with the rate of descent of the profile, bearing in mind dimensional changes in the profile arising from heating thereof.

Below the lower eight-jawed chuck the four-jawed chuck grips the descending profile and moves downwardly in synchronisation with the profile. While this happens, the saw is moved downwardly, in synchronisation with the profile, between the lower eight-jawed chuck and the four-jawed chuck, and the blade of the saw is moved horizontally into contact with the profile to separate a lowermost portion, of a desired length, eg 2 m, from the remainder thereof.

As soon as the severing is complete, the four-jawed chuck and the saw integrally joined thereto are lowered to feed the separated portion into an upwardly open pocket in the unit 20, which pocket has been indexed into position below the descending portion, in synchronisation with the descending four-jawed chuck, to receive this portion. The four-jawed chuck, when it has fed the portion into the pocket, releases it and reciprocates upwardly to its uppermost position, ready for the next descending operative cutting cycle, gripping the succeeding portion before it is severed from the remainder of the profile, before lowering it into the succeeding pocket of the unit 20; and the unit 20 is indexed to place the succeeding pocket in position to receive this succeeding portion in similar fashion.

Thus, each batch of feed mixture is continuously extruded from beginning to end thereof while, in repeating cyclical fashion, the profile handling stage 18, by use of the eight-jawed chucks, saw, four-jawed chuck and unit 20, as described above, continuously supports the descending profile while cyclically and successively separating lowermost portions from the descending profile, feeding them into succeeding pockets in the unit 20 and indexing them away by means of the unit 20 for further cooling thereof in gentle fashion.

After sufficient gentle cooling thereof, when a cyclic drying/sintering process is used, the profile portions can be removed from the unit 20 and carried up to the top of the cavity 14. After the batch of paste has been extruded, the portions obtained therefrom can be successively charged into the cavity, again using said rods to support the portions initially, with the extruder 12 swung out of the way, clear of the top of the cavity 14. The profile portions, stacked on one another, are then lowered through the cavity 14 by the eight-jawed chucks, and the magnetron assemblies can then be operated to heat the portions to sinter the portions at 1600° C.–1900° C., the profile previously having been dried, eg to 120–200° C. when initially continuously fed through the cavity.

The portions can then again be cooled and a suitable sinterable filtration membrane applied in known fashion to the inner surfaces of their filtration passages. Thereafter the portions can in similar fashion be lowered through the cavity, with the applied filter membrane thereon and the magnetron assemblies can be used to heat the profiles to a temperature at which the membrane becomes sintered to the surfaces of the filtration passages.

It should be noted that screw extrusion, compared with ram extrusion, promotes consistent continuous extrusion and the absence of dimensional anomalies in the profile. Continuous correlation of the diameter of the profile as it is extruded, and its rate of extrusion (extruder speed) with the lowering rate of the eight-jawed chucks further promotes production of a calcined profile of constant diameter and cylindrical shape, and having internal passages of constant diameter and cylindrical shape. This correlation and synchronisation is microprocessor-controlled and extruded diameter is monitored by the device 24, the synchronisation being determined by trial and error, or by a suitable microprocessor algorithm. It is also to be noted that, as mentioned above, the doors of the housing, being earth-strapped, provide a Faraday cage around the chamber 14, and the presence of the unit 20 below the chamber 14 reduces egress of microwave energy.

A major advantage of the process, at least as illustrated by the drawing, is that it may provide for the production of profiles, in particular membrane supports for filter elements, having high ratios of filtration area to length and, at the same time having substantial lengths. Thus lengths of up to 3–4 m are shown in principle to be possible for cylindrical profiles of up to 100–200 mm diameter, or more, and of relatively constant dimensions. In particular, it is to be noted that cycle times for production, from the start of extrusion until the final sintered product is obtained, can be reduced to no more than several hours, compared with several days when air drying, coupled with radiant heat sintering, is used.

What is claimed is:

1. A process for making an extruded dried ceramic product, which process includes the steps of:

extruding an elongated moist profile in a downward direction, the profile comprising a moist ceramic composition or a moist precursor thereof;

drying the extruded profile, at a position below the extrusion, by subjecting it to microwave radiation having a frequency of $0.3 \times 10^9 - 1 \times 10^{10}$ Hz to cause the profile to become progressively drier in the downward direction in which it is extruded;

continuously supporting the extruded profile during the extrusion and drying at a position where it has been at least partially dried by the microwave radiation; and intermittently and successively separating lowermost portions of the dried profile from the remainder of thereof at a position below said support position, to provide dried lengths of the profile.

2. The process of claim 1, wherein said extruding is in a vertically downward direction.

3. The process of claim 1, wherein as said extruding takes place, supporting the profile is by frictionally engaging it by means of support means.

4. The process of claim 1, wherein said profile initially has a leading end which is extruded into contact with a support, the leading end resting on the support and the support descending synchronously with the profile.

5. The process of claim 1, wherein said extrusion is continuous, the drying taking place continuously while the profile is extruded.

6. The process of claim 1, wherein said profile is subjected to a progressively reduced microwave power input along its length during extrusion thereof, the rate of power reduction also reducing progressively.

7. The process of claim 1, wherein said profile, immediately after being extruded, is subjected to a high microwave power input for a short period, by passing it through a short zone of high microwave intensity, the profile then being subjected to an intermediate microwave power input for an intermediate period, by passing it through an intermediate zone of intermediate length and of intermediate microwave intensity, and the profile being finally subjected to a low microwave power input for a long period, by passing it through a long zone of low microwave intensity.

8. The process of claim 1, wherein said separating is carried out by means of an upwardly and downwardly reciprocating cutting device arranged to descend intermittently and synchronously with the profile, the separation being by cutting each said portion of the profile in a plane transverse to its length while the cutting device descends synchronously with the profile.

9. The process of claim 1, further comprising the steps of calcining the dried profile and then sintering said profile, the calcining and sintering being by subjecting the profile to further microwave radiation.

10. The process of claim 9, wherein said calcining is carried out by heating the profile to a temperature of 700–1200° C., said sintering being carried out by heating the profile to a temperature of 1600–2400° C.

11. The process of claim 9, wherein said calcining and said sintering are carried out while the profile is being lowered and while it is being supported so that it extends in a downward direction.

12. The process of claim 9, wherein said calcining and said sintering are carried out on portions of the profile which have been separated from the remainder thereof.

13. The process of claim 1, wherein said profile is extruded downwardly through a die into a microwave cavity.

14. An installation for use in the making of an extruded dried ceramic product, which installation comprises:

an extrusion means for extruding in a downward direction a profile of a moist mixture comprising a ceramic composition or precursor thereof;

a support means for continuously supporting the profiles as it is extended at a position below the extrusion means; and at least one microwave radiation source operable to direct microwave radiation towards at least part of the profile below the extrusion means and above the support means, for drying the profile, the support means being arranged to support the extruded profile at a position below the microwave radiation source and where the profile has at least partially been dried by microwave radiation from the microwave radiation source, and the installation including severing means for severing, at a position below the said support position, the profile into a plurality of portions.

15. The installation of claim 14, wherein said extrusion means is an extruder provided with a die, the extruder being arranged to effect extrusion of an elongated profile in a vertically downward direction.

16. The installation of claim 14, wherein said support means comprises at least one chuck arranged to grip the profile, each chuck being arranged, while gripping the profile, to move downwardly synchronously with the profile as the profile is extruded.

17. The installation of claim 14, wherein said installation has a microwave cavity, the cavity being provided with a plurality of said microwave sources, at least some of which are adjustable as regards their microwave output, the sources being vertically and circumferentially spaced from one another around a central zone in the cavity down which, during drying thereof, the profile passes.

18. The installation of claim 17, said microwave sources form part of a multimode-wave microwave cavity.

* * * * *

UNITED STATES PATENT AND TRADEMARK OFFICE
CERTIFICATE OF CORRECTION

PATENT : 6,063,323
DATED : May 16, 2000
INVENTOR(S) : Fuls et al.

It is certified that error appears in the above-identified patent and that said Letters Patent is hereby corrected as shown below:

In claim 10, column 14, line 20, delete "C.," and insert -- C, -- therefor.

column 1, insert -- This application is a 371 of PCT/NL97/00284 filed May 20, 1997 now WO 97/44170, which claims priority from South Africa 96/3960 filed May 17, 1996, -- therefor.

Signed and Sealed this

Twentieth Day of March, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,063,323
DATED : May 16, 2000
INVENTOR(S) : Fuls et al.

It is certified that error appears in the above-identified patent and that said Letters Patent is hereby corrected as shown below:

Title page,
Item [73], please insert -- CSIR, Gauteng Province, South Africa -- therefor.

Signed and Sealed this

Twenty-third Day of October, 2001

Attest:

NICHOLAS P. GODICI
*Attesting Officer*  *Acting Director of the United States Patent and Trademark Office*